(12) United States Patent
Di Dio

(10) Patent No.: US 11,689,909 B2
(45) Date of Patent: *Jun. 27, 2023

(54) LONG-RANGE NARROWBAND TRANSMISSION USING NEAR VERTICAL INCIDENCE SKYWAVE (NVIS)

(71) Applicant: CABLE TELEVISION LABORATORIES, INC., Louisville, CO (US)

(72) Inventor: Mario Di Dio, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,914

(22) Filed: Aug. 31, 2021

(65) Prior Publication Data

US 2021/0400455 A1    Dec. 23, 2021

Related U.S. Application Data

(63) Continuation of application No. 16/654,652, filed on Oct. 16, 2019, now Pat. No. 11,109,207.

(60) Provisional application No. 62/746,714, filed on Oct. 17, 2018.

(51) Int. Cl.
*H04L 5/00* (2006.01)
*H04W 4/38* (2018.01)
*H04W 4/80* (2018.01)
*H04W 72/0453* (2023.01)

(52) U.S. Cl.
CPC ............. *H04W 4/80* (2018.02); *H04L 5/0055* (2013.01); *H04W 72/0453* (2013.01)

(58) Field of Classification Search
CPC ..... H04W 4/80; H04W 72/0453; H04W 4/38; H04W 72/02; H04L 5/0055; Y02D 30/70
See application file for complete search history.

(56) References Cited

U.S. PATENT DOCUMENTS

| | | |
|---|---|---|
| 10,051,606 B1 | 8/2018 | Nelson et al. |
| 11,109,207 B2 * | 8/2021 | Dio .................. H04L 5/0055 |
| 2007/0088553 A1 | 4/2007 | Johnson |
| 2011/0003607 A1 * | 1/2011 | Forenza ............ H04B 7/0413 |
| | | 455/501 |
| 2018/0097550 A1 | 4/2018 | Perlman et al. |

* cited by examiner

*Primary Examiner* — Joseph E Dean, Jr.
(74) *Attorney, Agent, or Firm* — PdZ Patent Law, PLLC

(57) ABSTRACT

Long-range, narrowband transmission using near vertical incidence skywave (NVIS) or other communications relying upon reflection off of the ionosphere to facilitate communications is contemplated, such as to enable low-power, low-rate wireless transmission of data from sensors, IoT devices or other componentry over large distances.

20 Claims, 2 Drawing Sheets

LONG-RANGE NARROWBAND TRANSMISSION USING NEAR VERTICAL INCIDENCE SKYWAVE (NVIS)

CROSS-REFERENCE TO RELATED APPLICATIONS

This application is a continuation of U.S. patent application Ser. No. 16/654,652, filed Oct. 16, 2019, which application claims the benefit of U.S. provisional application No. 62/746,714, filed Oct. 17, 2018, the disclosures of which are incorporated in their entirety by reference herein.

TECHNICAL FIELD

The present invention relates to long-range, narrowband transmission using near vertical incidence skywave (NVIS) or other communications relying upon reflection off of the ionosphere to facilitate communications, such as to enable low-power, low-rate wireless transmission of data from sensors, IoT devices or other componentry over large distances

BACKGROUND

The Internet of Things (IoT) may generally be referred to as a growing industry comprised of a massive number of devices operating in a connected manner to facilitate sending and receiving data for various purposes. IoT devices may operate in an automated or semi-automated manner whereby data may be shared automatically in response to detected events, optionally to enable sharing of data without requiring a user to particularly direct or instigate the data transmission. The IoT devices may include more limited operating systems and less functional processing capabilities than traditional computers, and instead, focus of executing a single task or limited-processing task, such as reporting sensor data or other measurements. Examples of some IoT devices may include thermostats, security cameras, voice-commanded personal digital assistants (PDAs) and wearable electronics, which may be configured to facilitate any number of operations, such as to enable refrigerators to talk with the Internet to order milk and wearable electronics to tell you when to step more to meet your daily exercise goals.

IoT may involve the use of sensors or other devices particularly designed for wirelessly transmitting information periodically over long distances for years, optionally on a single battery. The LoRa™ Alliance, in its LoRaWAN™ 1.0.3 Specification, describes one network protocol to facilitate low-power, low-rate wireless transmission of data, such as over a low power wide area network (LPWAN). LPWANs may be designed to cover large geographical areas in a manner intended to minimize the amount of power required for sensors to interact with the network. The nature of a LPWAN network potentially allows IoT devices to run for years on small batteries, occasionally sending out small packets of data, waiting for a short time for response messages, and then closing the connection until more data needs to be sent. IoT devices can utilize the LPWAN networks to send data packets to any number of gateways, such as by broadcast data for receipt any gateway within range. The gateways can then use more traditional communications, such as wired and/or wireless Internet connections, to forward the messages to a network-server that then validates the packets and forwards the application payload to an application-server or other back end processing element.

LPWANs and other network configurations used to facilitate wirelessly exchanging data between IoT devices and gateways may utilize Wi-Fi, cellular and satellite signaling. The use of Wi-Fi or cellular signaling may require the IoT devices to be in a relatively close proximity to the gateways, which can make it difficult for IoT devices in remote locations where Wi-Fi or cellular access may be limited or non-existent. The use of satellite signaling may require the IoT devices to have sophisticated capabilities for antenna pointing and other signal manipulation, which can be expensive and draining on potentially limited power sources. One non-limiting aspect of the present invention contemplates facilitating communications without the expense and technical challenges associated with satellite signaling and with a greater range than Wi-Fi or cellular signaling, such as with the use of near vertical incidence skywave (NVIS) or other communications relying upon wireless signal reflection off of the ionosphere.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
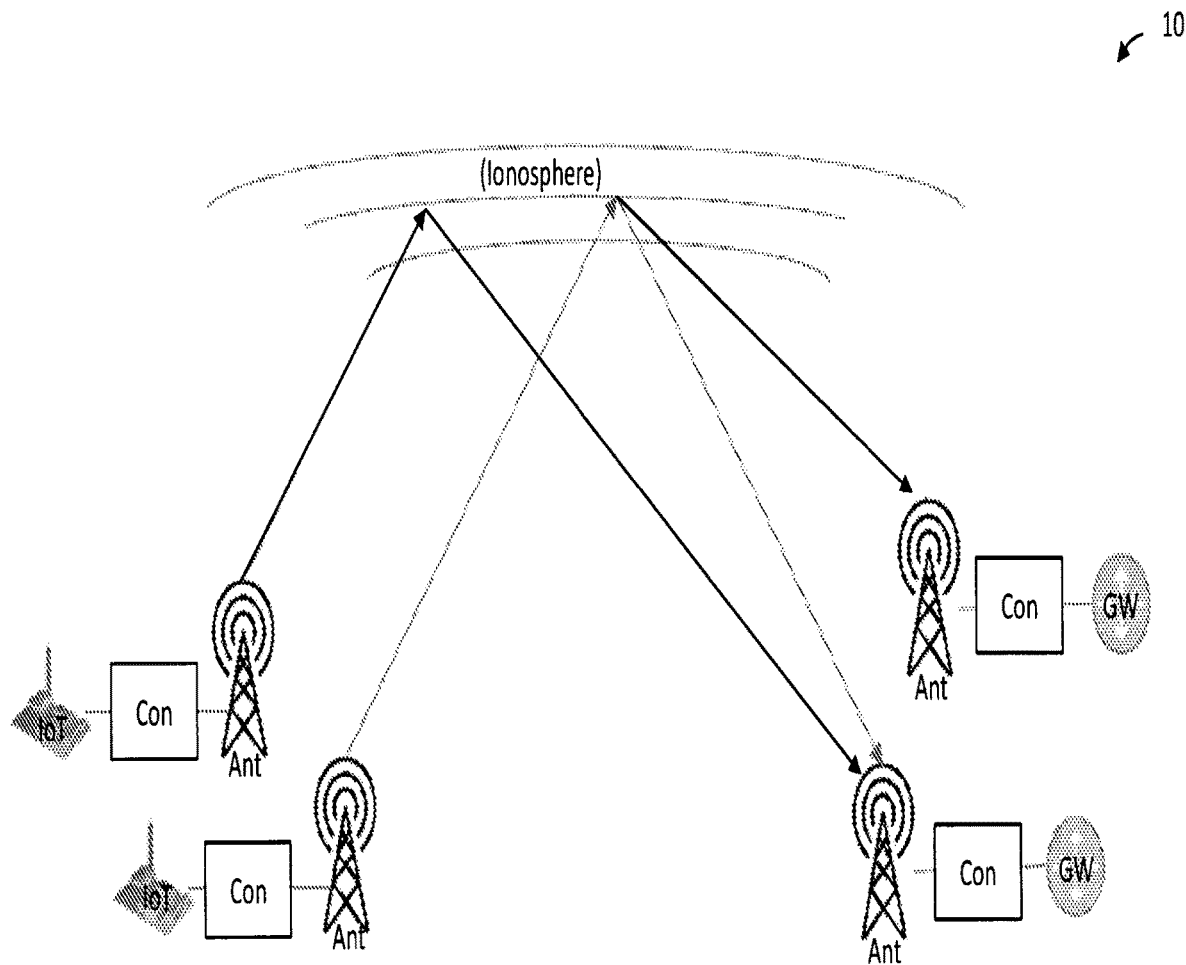
FIG. 1 illustrates a communication system optimized in accordance with one non-limiting aspect of the present invention to facilitate long-range, narrowband transmission.

FIG. 1 illustrates a communication system 10 optimized in accordance with one non-limiting aspect of the present invention to facilitate long-range, narrowband transmission. The communication system 10 may be suitable for use in facilitating low-power, low-rate wireless transmission of data for IoT devices or other devices having capabilities sufficient to communicate according to any suitable network protocol and are predominately described with respect to facilitating communications of the type contemplated in the LoRa™ Alliance, in its LoRaWAN™ 1.0.3 Specification, the disclosure of which is hereby incorporated by reference in its entirety herein. The IoT devices may be connected via a coaxial cable or other medium to or otherwise associated with an antenna (Ant) to facilitate near vertical incidence skywave (NVIS) or other communications relying upon reflection off of the ionosphere. The NVIS may require proper selection of a frequency for region-wide NVIS propagation using radio propagation and F-Layer atmospheric refraction around 65°-90° to enable low-power local and region communications within a radius of 300 to 400 miles using low power (5-100 watts) transmitters. The IoT devices may share an antenna and/or utilize independent antenna, which may be low wires or loaded whips, mounted horizontally, less than ⅛th W in height, and optionally including two dipoles (80-Meters@121 feet & 40-Meters@65 feet) mounted at right angles about ten feet above the ground. The IoT devices may use the NVIS to communicate with one or more gateways (GW) or other interface associated with low power wide area network (LPWAN) or other backbone or infrastructure sufficient to exchange corresponding messaging with an application or other operating system (not shown), such as in the manner described in U.S. patent application Ser. No. 15/844,087 Normalization Of Data Originating From Endpoints Within LPWANS, the disclosure of which is hereby incorporated by reference in its entirety herein.

A converter (Con) may be included between the antennas and the IoT devices and gateway to facilitate up converting and down converting LoRaWAN™ or other specification defined signaling to facilitate NVIS communications. The converters may include a processor and/or operate in cooperation with a processor associated with the IoT devices/gateways and/or the antennas to facilitate up/down converting NVIS signaling, i.e. to facilitate converting the signaling reflecting off the ionosphere between the antennas. The converters may include componentry or chipsets designed to down convert signaling originating from the IoT devices and the gateway for transmission to the ionosphere and to thereafter up convert the related signaling for communication to the IoT devices and the gateway. One non-limiting aspect of the present invention contemplates the IoT devices and the gateway modulating messages or other signaling desired for communication according to predefined frequencies, such as according to regional Industrial, Scientific and Medical (ISM) frequency bands for IoT devices, e.g., around 433 or 860 MHz in Europe or around 915 MHz in the United States, in a manner sufficient for NVIS communications. This may include the converters facilitating conversion of the corresponding signaling to support NVIS communications, which may require signals at a maximum of 100 MHz and preferably in the range of 1-10 MHz maximize transmission range and minimize data loss.

The converters may be integrated with or otherwise attached via to a radio frequency (RF) port or other interface to facilitate exchanging signaling between the antennas and the corresponding IoT device/gateway. The converters may enable the IoT devices and gateway to modulate signaling according to native LoRaWAN™ capabilities, i.e., according to one of the regional ISM frequency bands, without having to execute up/down conversions necessary to facilitate the NVIS communications. The converters may operate using power from the IoT devices and/or be independently operating/powered devices having capabilities commence with the IoT devices to facilitate long-term, low-power operation. The converters may be beneficial in enabling the IoT devices and the gateway to operate according to native capabilities without having to be reconfigured or otherwise manipulated to perform processing necessary to facilitate the NVIS communications. Converting the signaling from the higher frequencies associated with the native capabilities of the IoT devices and the gateway to the lower frequencies associated with the NVIS communications may enable the present invention to leverage the reflection of signaling off of the ionosphere to provide long-range, narrowband transmission of messaging or other signaling between the IoT devices and the gateway or other gateways in the range thereof without the expense and technical challenges associated with satellite signaling and with a greater range than Wi-Fi or cellular signaling.

The present invention contemplates utilizing the converters optionally without altering operation of IoT devices and gateways from the LoRaWAN™ specification or other operating system so as to facilitate ease of use and deployment, however, the native capabilities of the IoT devices and/or gateway may instead be altered to the exclusion of the converters, i.e., the IoT devices and the gateway may include capabilities to facilitate the NVIS communications without deviating from the scope and contemplation of the present invention. One converter contemplated by the present invention may be of the type having circuitry or hardware capable of facilitating up/down conversion of the signaling at variable efficiencies, such as with a decimation filter to down convert signaling and an interpolation filter to up convert signaling. The variable efficiencies of the converter may result from the circuitry/hardware being better at converting between certain frequencies. The exact conversation ratio and the resulting output frequency may be chosen as a function of the input frequency, the property of the clock installed on board of the converter and the time-variant characteristics of the NVIS radio propagation link, i.e., the ionosphere between the IoT device and the gateway.

The converters may execute a frequency selection process to facilitate maximizing or prioritizing the frequency conversions, i.e., maximizing the frequencies utilized when converting between the 1-100 MHz utilized between the antennas to facilitate NVIS communications and the 433, 860 or 915 MHz associated with the native capabilities of the IoT devices/gateway. The frequency selection process may optionally be implemented according to the processor of the converter and/or the attached device executing a plurality of instructions stored on a corresponding non-transitory computer-readable medium. The frequency selection process may include choosing a conversion ratio, such as an integer, to facilitate realizing an output frequency that is a submultiple of the input frequency. In the U.S., for example, the input frequency of 915 MHz, i.e., the frequency utilized by the IoT devices and the gateways, may prioritize use of a conversion ratio of 100 to convert signaling to 9.15 MHz, a ratio of 200 to convert to 4.575 MHz or any other integer submultiple as an output frequency. The conversion ratio processing may be useful in minimizing out-of-band emissions of signal images and help optimize power amplifier efficiency and maximize propagation range.

The capability to select the conversion ratio according to efficiencies dictated by construction of the converter and the input/output frequencies required by the IoT device/gateway may enable the present invention to provide maximize efficiency of the NVIS communications without requiring the IoT device/gateway to deviate from existing standards of operation. The frequency selection process may optionally include capabilities for assigning an efficiency value to each of the conversion ratio/integer submultiples, such as to prioritize use of the conversion ratios according to efficiency, e.g., to prioritize to 9.15 MHz over 4.575 MHz or other less efficient submultiples. The efficiency values/rankings may be beneficial when selecting a next-best frequency for retransmission when a prior transmission goes unacknowledged. The frequency selection process may also include capabilities to facilitate changing the priorities of the conversion ratios or selecting different conversion ratios depending on measured conditions, e.g., a conversion ratio for 9.15 MHz may be prioritized during daytime while a conversion ratio for 4.575 MHz may be prioritized during nighttime in order to maximize transmission range given the different propagation properties of the ionosphere during the day and night.

Figure 2:
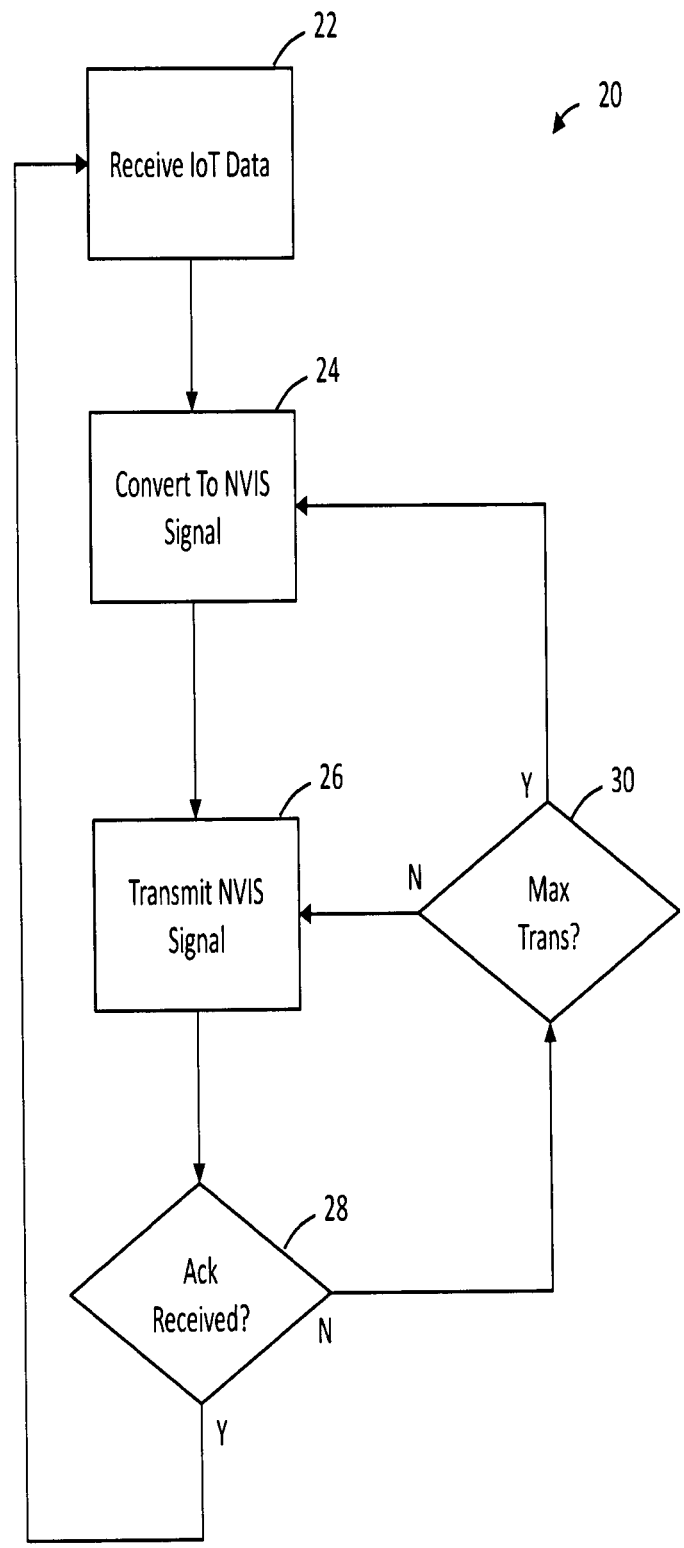
FIG. 2 illustrates a flowchart of a method for long-range narrowband transmission using NVIS in accordance with one non-limiting aspect of the present invention.

FIG. 2 illustrates a flowchart 20 of a method for long-range narrowband transmission using NVIS in accordance with one non-limiting aspect of the present invention. A data process 22 may relate to an IoT device desiring to transmit IoT data or other information, such as in accordance with the LoRaWAN™ specification, whereby a converter of the type contemplated herein intercepts the data prior to transmission. A conversion process 24 may relate to the converter converting the IoT data for transmission with NVIS signaling, such as by selecting a most efficient one of the conversion ratios for down converting the signaling generated by the IoT device to the signaling required for NVIS communications, e.g., converting from 915 MHz to 9.15 MHz. A transmit process 26 may relate to the converter interfacing the NVIS signaling with a suitable antenna whereafter the corresponding signal may be broadcasted over the ionosphere for receipt at one or more gateways within the range thereof. An acknowledgment process 28 may relate to assessing whether a responsive acknowledgment was received from one of the gateways receiving the NVIS signaling. The acknowledgment may be issued from one or more of the gateways after a converter thereat up converts the NVIS signaling for processing and then down converts a responsive acknowledgment for NVIS communication back to the originating IoT device.

A retransmission process 30 may correspond with facilitating retransmission of the NVIS signaling in the event that IoT device fails to receive an acknowledgment in response to the prior transmission. The retransmission process 30 may include assessing whether a maximum number of retransmissions of the same NVIS signaling has already occurred. If the retransmission threshold has not been surpassed, the NVIS signaling may be resent in the transmit process 26, and if the retransmission threshold has been surpassed, the conversion process 24 may be re-instigated. The re-instigation of the conversion process 24 may include the converter selecting a next-best conversion ratio for converting the IoT data, e.g., using a next conversion ratio to facilitate generation of the NVIS signaling at 4.575 MHz instead of the previously attempted 9.15 MHz. The converter may include a prioritized listing of conversion ratios for particular input frequencies from the IoT device such that the next-best conversion ratio may be determined according to rankings in the listing. The conversion process 24 may optionally include changing the input frequency of the IoT data, such as by the converter requesting IoT device to regenerate the IoT data and another center frequency within its operational frequency band, e.g., rather than generating the signaling at 915 MHz the IoT device may regenerate the signal at 917 MHz in order to enable the converter to use the same conversion ratio, which may correspond with its maximum efficiency or preferred mode of operation.

The conversion process 24 may relate to the converter selecting conversion ratios according to known rankings or capabilities dictated by its filters and other operating requirements so as to facilitate maximizing efficiency of the conversion while minimizing any loss of data and maximizing use of frequencies best suited for the NVIS communications. While the present invention contemplates using conversion ratios based on integers to maximize efficiency, the use of non-integer may be implemented if the NVIS signaling is unsuccessful after a number of attempts made at integer-based frequencies. The conversion process 24 may re-rank the conversion ratios prioritize for a particular converter, such as to change rankings according to time of day, e.g., conversion ratios providing a higher frequency may be prioritized during the day while those providing lower frequencies may be prioritized during the night to account for propagation characteristics of the ionosphere bearing throughout the day. The conversion process 24 may also consider frequency agility of the IoT device, i.e. capabilities of the IoT device to generate the data at different frequencies within its operational band, and spectrum planning or pre-assignment of the region, e.g., using different frequencies in Europe versus the United States.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for maximizing a communication range of a IoT device to facilitate long-range, narrowband wireless transmission of data, the method comprising:
   receiving data from the IoT device, the IoT device generating the data at a first frequency greater than a maximum frequency required for Near Vertical Incidence Skywave (NVIS) communications;
   converting the data to a second frequency sufficient for NVIS communications; and
   transmitting the data at the second frequency from an NVIS antenna associated with the IoT device.

2. The method of claim h further comprising retransmitting the data at a third frequency from the NVIS antenna when the IoT device fails to receive an acknowledgment for the data transmitted at the second frequency, the third frequency being different than the second frequency and sufficient for NVIS communications.

3. The method of claim 2, further comprising selecting the second and third frequencies with a frequency selection process, the frequency selection process prioritizing a plurality of frequencies according to physical capabilities of the IoT device to down convert the first frequency, the second and third frequencies being corresponding ones of the plurality of frequencies, the second frequency being prioritized over the third frequency.

4. The method of claim h wherein:
   the first frequency is greater than 100 MHz; and
   the second frequency is no more than 100 MHz.

5. A system for long-range, narrowband wireless transmission of data, the system comprising:
   an IoT device for generating the data at a first frequency greater than a maximum frequency required for Near Vertical Incidence Skywave (NVIS) communications;
   a converter for converting the data to a second frequency sufficient for NVIS communications; and
   an antenna for transmitting the data off of the ionosphere at the second frequency.

6. The system of claim 5, wherein the converter includes a processor and a non-transitory computer-readable medium having a plurality of instructions executable with the processor to facilitate converting the data from the first frequency to the second frequency.

7. The system of claim 6, wherein the plurality of instructions are sufficient for facilitating a frequency selection process whereby a conversion ratio is selected for converting the data from the first frequency to the second frequency.

8. The system of claim 7, wherein the plurality of instructions are sufficient for selecting a first conversion ratio during daytime and a second conversion ratio during nighttime, the first conversion ratio being greater than the second conversion ratio.

9. The system of claim 7, wherein the plurality of instructions are sufficient for executing a retransmission process when the converter fails to receive an acknowledgment to the data transmitted at the second frequency.

10. The system of claim 9, wherein the retransmission process includes retransmitting the data after conversion to a third frequency using another conversion ratio.

11. The system of claim 9, wherein the retransmission process includes:
   instructing the IoT device to re-generate the data at a third frequency;
   converting the re-generated data from the third frequency to a fourth frequency using the conversion ratio; and
   transmitting the re-generated data off of the ionosphere at the fourth frequency.

12. A method for wireless transmission of data, the method comprising:
   receiving data from a device, the device generating the data at a first frequency;
   converting the data to a second frequency sufficient for Near Vertical Incidence Skywave (NVIS) communications; and
   transmitting the data at the second frequency from an NVIS antenna associated with the device.

13. The method of claim 12, further comprising retransmitting the data at a third frequency from the NVIS antenna when the device fails to receive an acknowledgment for the data transmitted at the second frequency, the third frequency being different than the second frequency.

14. The method of claim 13, further comprising selecting the second and third frequencies according to capabilities of the device.

15. The method of claim 12, wherein:
   the first frequency is greater than 100 MHz; and
   the second frequency is no more than 100 MHz.

16. The method of claim 12, wherein the device is an Internet of Things (IoT) device.

17. A system for wireless transmission of data, the system comprising:
   a device for generating data at a first frequency;
   a converter for converting the data to a second frequency sufficient for Near Vertical Incidence Skywave (NVIS) communications; and
   an antenna for transmitting the data at the second frequency for reflection off of the ionosphere.

18. The system of claim 17, wherein the converter is further configured to execute a retransmission process in response to the converter failing to receive an acknowledgment of data transmitted at the second frequency.

19. The system of claim 18, wherein the retransmission process includes:
   instructing the device to re-generate the data at a third frequency;
   converting the re-generated data from the third frequency to a fourth frequency; and
   transmitting the re-generated data at the fourth frequency for reflection off of the ionosphere.

20. The system of claim 17, wherein the device is an Internet of Things (IoT) device.

\* \* \* \* \*